United States Patent [19]
Maruoka et al.

[11] Patent Number: 5,412,769
[45] Date of Patent: May 2, 1995

[54] METHOD AND SYSTEM FOR RETRIEVING TIME-SERIES INFORMATION

[75] Inventors: Tetsuya Maruoka, Sagamihara; Shoichi Masui, Kawasaki, both of Japan

[73] Assignee: Hitachi, Ltd., Tokyo, Japan

[21] Appl. No.: 995,154

[22] Filed: Dec. 22, 1992

[30] Foreign Application Priority Data

Jan. 24, 1992 [JP] Japan .................. 4-010541

[51] Int. Cl.$^6$ ............................................. G06F 15/24
[52] U.S. Cl. ............................................. 395/140
[58] Field of Search .............. 395/140, 155, 161, 141, 395/142, 143; 345/133, 134, 139, 140

[56] References Cited
U.S. PATENT DOCUMENTS
5,283,865 2/1994 Johnson ........................ 395/161

Primary Examiner—Phu K. Nguyen
Attorney, Agent, or Firm—Fay, Sharpe, Beall, Fagan, Minnich & McKee

[57] ABSTRACT

A method and apparatus is provided for retrieving time-series information so as to permit a user to readily retrieve non-numeric data such as character sequence information. The system provides for a prediction system to take into consideration such non-numeric data in association with retrieval result. In the system, a transition graph of the time-series data is displayed, a prediction result is determined based on determined time-series information, and a representation as to validity of a prediction to actual data is displayed on the graph. When a user enters a desired time point, news and event occurrences at that time point are retrieved from an event database and they are displayed in a designated area. Thus, the non-numeric information, such as news, which has occurred at a prediction miss point can be reflected to a prediction rule during a subsequent prediction.

7 Claims, 11 Drawing Sheets

| ARRAY NUMBER | DATE | OPEN PRICE | HIGH PRICE | LOW PRICE | CLOSED PRICE | STICH | UPPER DICK | LOWER DICK | |
|---|---|---|---|---|---|---|---|---|---|
| 1 | 89.01.04 | 102.03 | 102.24 | 101.88 | 102.09 | -0.06 | 0.15 | 0.15 | |
| 2 | 89.01.05 | 102.10 | 102.19 | 102.06 | 102.06 | -0.04 | 0.09 | 0.00 | |
| 3 | 89.01.06 | 102.06 | 102.06 | 102.03 | 102.03 | -0.03 | 0.00 | 0.00 | |
| 4 | 89.01.07 | 102.03 | 102.08 | 101.85 | 101.98 | -0.05 | 0.05 | 0.13 | |
| ⋮ | ⋮ | ⋮ | ⋮ | ⋮ | ⋮ | ⋮ | ⋮ | ⋮ | |
| N | 89.10.26 | 106.10 | 106.90 | 106.00 | 106.50 | 0.40 | 0.40 | 0.10 | |
|  | 0 | 0.0 | 0.0 | 0.0 | 0.0 |  |  |  | |
| 301 | 302 | 303 | 304 | 305 | 306 | 307 | 308 | 309 | |

300

310

F I G. 5

| DATE | EVENT, NEWS | CLASSIFICATION KEY WORD |
|---|---|---|
| 89. 01. 04 | BANK OF JAPAN ANNOUNCED TO CONDUCT THE LOWERING OF AN OFFICIAL RATE ON JANUARY 28 | DOMESTIC, BANK OF JAPAN |
| 89. 01. 04 | U.S. ANNOUNCED THAT UNEMPLOYMENT RATE OF DECEMBER 1988 TURNED OUT WORSE | U.S., UNEMPLOYMENT |
| ... | ... | ... |
| 89. 03. 26 | U.S. RELIEVED 20% THE IMPORT CONTROL TO JAPAN MODE CORS | U.S., TRADE |
| 89. 03. 26 | COMMODITY PRICE RISE RATE OF METROPOLITAN WILL FURTHER RISE | DOMESTIC, COMMODITY PRICE |
| 89. 03. 26 | THE EXTRAORDINARY DIET WILL ALMOST SURELY PASS THE INTRODUCTION OF CONSUMPTION TOX | DOMESTIC, TAX |
| ... | ... | ... |
| 89. 06. 21 | CONTROL TO SALMON AND TROUT CATCH OF NORTH OCEAN FISHERY REDUCES TO 70% OF LAST YEAR | RUSSIA, FISHERY |
| 89. 06. 21 | JAPAN-U.S. SUMMIT MEETING FROM NEXT WEEK TO FOCUS ON TRODE UNBALANCE | U.S., TRODE |
| 89. 06. 21 | THE METEOROGY AGENCY MODE LONG TERM FORCAST OF COLD SUMMER THIS YEAR | DOMESTIC, METEOROGY |
| ... | ... | ... |

$(X_0, Y_0)$ : X-Y COORDINATES OF CORNER 604 OF CLOSED PRICE GRAPH DISPLAY AREA ON SCREEN $(X_1, Y_1)$ : X-Y COORDINATES OF CORNER 605 OF CLOSED PRICE GRAPH DISPLAY AREA ON SCREEN

N : NUMBER OF DATA TO BE PLOTTED (NUMBER OF RECORDS)

Max : MAXIMUM CLOSED PRICE

Min : MINIMUM CLOSED PRICE

THEN COORDINATES $(x_i, y_i)$ ON SCREEN OF $i$-TH LINE CLOSED PRICE $V_i$ ARE

$$x_i = X_0 + \frac{(X_1 - X_0) \times i}{N} \quad (1)$$

$$y_i = Y_0 + \frac{(Y_1 - Y_0) \times (V_i - \text{Min})}{\text{Max} - \text{Min}} \quad (2)$$

| ARRAY NUMBER | PREDICTION | ACTUAL |
|---|---|---|
| 1 | −0.05 | −0.03 |
| 2 | +0.03 | −0.03 |
| 3 | −0.10 | −0.05 |
| 4 | +0.15 | +0.13 |
|   |   |   |
| N | NONE | NONE |
|   |   |   |

$$i = \frac{X_i - X_0}{X_1 - X_0} \times N \qquad (3)$$

$X_i$ : INPUT X-COORDINATE $i$ : CORRESPONDING ARRAY NUMBER $X_1$ : X COORDINATE OF CORNER 605

$X_0$ : X COORDINATE OF CORNER 604

N : NUMBER OF PLOTTED DATA
  (NUMBER OF RECORDS)

METHOD AND SYSTEM FOR RETRIEVING TIME-SERIES INFORMATION

BACKGROUND OF THE INVENTION

The present invention relates to a system for predicting based on time-series information and a method for retrieving the time-series information, and more particularly to method and system for retrieving time-series information which reflect retrieved time-series information as non-numerical information to a predicted result when the result predicted based on a certain low does not hit, for use in subsequent prediction.

As a system for predicting a future value based on time-series information, dealing business in financial business has been known. The dealing business has a target to predict future prices of bonds, stocks and commodities and make profit by trading them in accordance with the prediction.

As a price prediction method, technical analysis of a chart has been used. In this method, past trading data in a market is modified to display various graphs called charts, and a change of price is predicted by recognizing shapes of the graphs and transition patterns. A systemized example of this method is disclosed in "Proposal of Pattern Recognition Type Reduction System of Plural-Time-Series Data (Development of Decision Making Support System Having Knowledge Base (1))" by Maruoka, Yasunobu and Kida, Information Processing Society of Japan, 41th (1990, the latter term) National Conference, Lecture Papers 2-35, 36. In the disclosed method, each pattern to be recognized is represented by an IF-THEN type rule, and a plurality of condition clauses representing status of time-series data which specifies the pattern are described in the IF part, and an action to be taken when the conditions of the IF part are met is described in the THEN part. Fuzzy theory is applied to the conditions of the IF part and a form of a membership function of a fuzzy aggregate is defined for each condition clause. Predicted changes in the time-series data and output messages are described in the THEN part as the action to be taken when the pattern is met.

"Time-Series Data Prediction By A Neural Network (Prediction of Timing of Stock Trading)" by Ohmoto, Ida and Takeoka, Information Processing Society of Japan, 41th (1990, the latter term) National Conference, Lecture Papers 2-133, 134 discloses a method for predicting a trade timing by structuring a plurality of moduled neural networks having knowledge of relationships between various technical indices and economic indices and a trade timing of TOPIX (which is a weighted average of stock values of the first group listed stocks by the number of stocks issued and which is an index reflecting an average change of the stocks). A trade timing which is an index weighted average of period return is used as teacher data.

In the above prior art methods, the time-series data is predicted based on the numerical data, but since the trading price is not determined merely based on the past numerical data, a success rate was not high in either of those methods. In order to improve the success rate, political and economical affairs which happen from time to time should be taken into consideration because they significantly affect to the price. However, since information on those affairs is represented by a text or a character sequence, it is difficult to numerize it and it cannot be built in the prediction system.

Thus, the prior art methods do not take the political or economical information into the system because of difficulty in numerization although it is important information in the prediction.

SUMMARY OF THE INVENTION

It is a first object of the present invention to provide method and system for retrieving time-series information which take text or character sequence information which is difficult to numerize into a prediction system so that the information is retrieved and displayed in combination with retrieved result.

It is a second object of the present invention to provide method and system for retrieving time-series information which permit easy retrieval of information which has caused misprediction.

In order to achieve the above objects, the method for retrieving time-series information of the present invention is implemented in the following steps.

(a) In a system for predicting future time-series information based on determined time-series information, detail of the determined time-series information is stored in a table and past news and event information is stored in a database as time passes. A graph showing a transition of the determined time-series information is displayed on a screen. Based on the table, a prediction result at each moment is calculated in accordance with a predetermined rule, and the calculated prediction result and the determined time-series information are compared. Depending on the comparison result, a match or mismatch mark is marked on the graph on the screen. When a user points any time point on the graph, the past news or event corresponding to the pointed time point is retrieved from the database and displayed on the screen.

(b) In the database, the past news and event information which is stored as time passes as well as content classification information are stored, and when the news or events are retrieved and displayed on the screen, the news and event information is classified by the class.

(c) Trade price data in the dealing is stored as the determined time-series information, and when a prediction result for a given time point is to be calculated based on the past data, a future trade price is predicted by using an IF-THEN type rule.

(d) In the retrieval of the database, past news and event information which relates to the determined time-series information is stored in the database as time passes. A graph which represents a transition of the time-series information is displayed on the screen, and when a user specifies a time point on the displayed graph of the time-series information as an entry for a retrieval condition, the time point of the time-series information corresponding to the specified time point is determined, and query is made to the database by using the information relating to the determined time point as a key.

The retrieval system of the present invention is implemented in the following manner.

(e) The retrieval and display system comprises an input device by which a user enters a retrieval condition, a processing unit used for retrieval and information display, a display device for outputting a processed result, and a database memory unit for storing past news and event information as time passes. Provided on a screen of the display device are a graph display area for displaying a graph representing a transition of the determined time-series information, a hit/miss display area for displaying a hit/miss mark to the prediction for a given time point displayed on the graph, an area for designating a retrieval execution command, a command for clearing data erroneously entered from the input device, and an end of process command, an input data display area for displaying a data of input item to be retrieved, and a retrieval result display area for displaying news and event information retrieved from the database by using the data displayed in the input data display area as a key.

In the present invention, past political and economical affairs related to the time-series information is stored, and the transition graph of the determined time-series information is displayed. Information on the comparison of the prediction result and the actual price at a given time point of the time-series information is outputted on the transition graph. If the prediction misses, a time point which corresponds to the time point pointed on the transition graph is determined, and the information at that time point is retrieved from the stored past information and displayed.

In this manner, the information which is hard to numerize can be held in the recording medium and the information relating to the designated time point can be readily retrieved. Since the match/mismatch information for the prediction result and the actual is displayed on the transition graph in connection with the designated time point, the prediction result can be readily determined. If the prediction misses, the affair information which happened at that time point can be readily obtained so that the importance of the affair and a relationship to the price can be deduced from the actual, and numerized.

DESCRIPTION OF THE PREFERRED EMBODIMENTS

Figure 1:
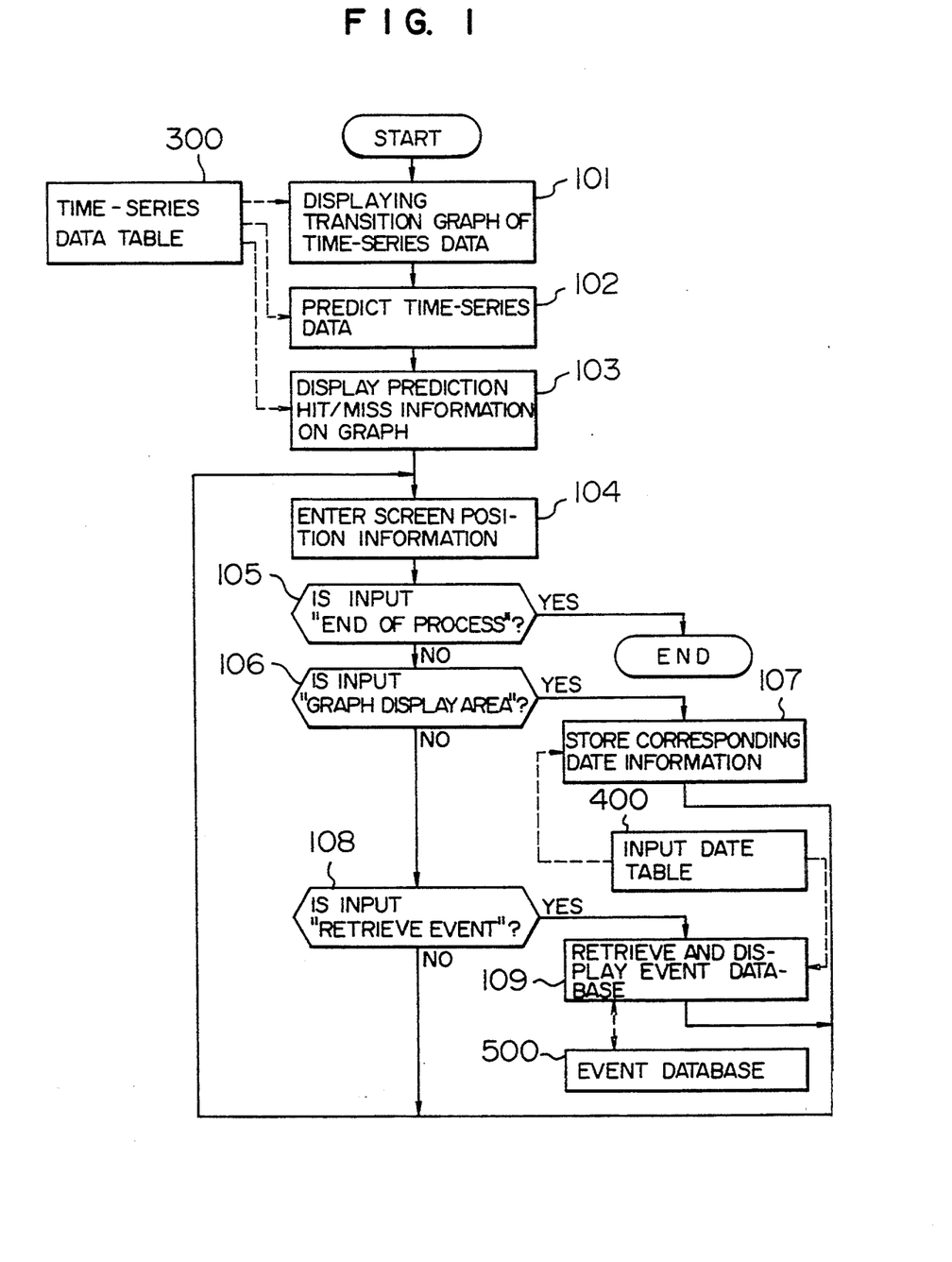
FIG. 1 shows a flow chart of one embodiment of a time-series information retrieval method of the present invention.

Embodiments of the present invention will now be explained in detail with reference to the drawings. FIG. 1 shows a flow chart of the time-series information retrieval method in one embodiment of the present invention.

As a specific example, a bond price prediction system in dealing business in financial business such as a bank is explained. As a prediction technique, technical analysis of a chart which is widely used in bonds, stock and foreign exchanges is used. Namely, actual data of trade which shows past bond prices is represented in a chart (transition graph), and a future price is predicted based on a transition status and a shape (pattern) of the graph. The prediction is made by a user which he/she watches the displayed chart and recognizes the transition status and the shape of the chart.

In the present embodiment, the chart is recognized by utilizing a conventional IF-THEN type rule, and a future price is predicted based on the recognition result. In the present embodiment, in order to acquire information which caused the prediction miss, event or news is retrieved in the course of process and the affair is reflected to the prediction.

FIG. 1 shows an outline of the process sequence of the present invention. Detailed processes of the respective steps will be explained in connection with FIG. 3 et seq. First, based on a past time-series data table 300, a transition graph of the time-series data is displayed on a screen of a terminal (101). Time-series data is predicted by recognizing a pattern shape of the graph (102), and prediction hit/miss is displayed on the graph (103). In order to retrieve news or event at the time point of the prediction miss, screen position information is entered (104), and if the input is not termination of process (105) but graph display area (106), corresponding date information is stored by referring an input date table 400 (107). If the input is event retrieval (108), an event database 500 is searched and retrieval result is displayed (109).

Figure 2:
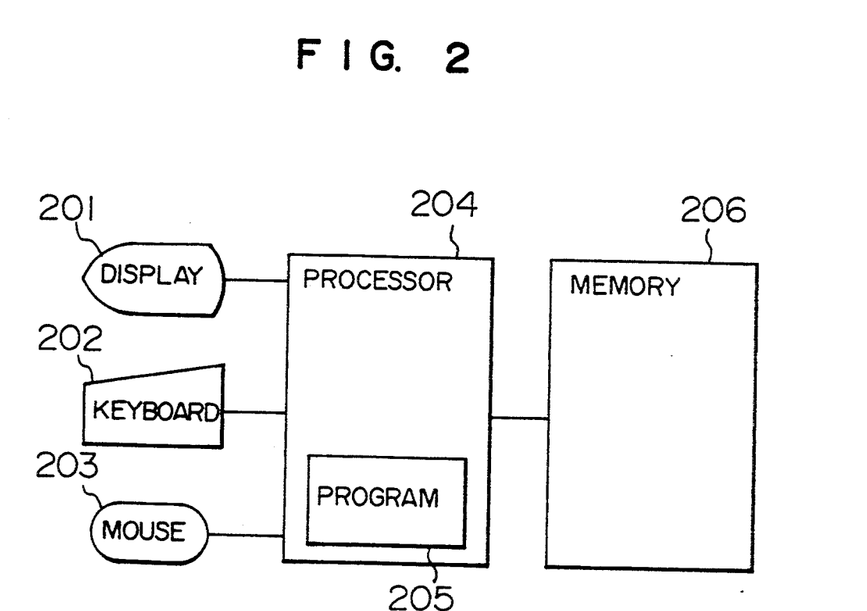
FIG. 2 shows a hardware configuration of one embodiment of a price prediction system of the present invention.

FIG. 2 shows a hardware configuration of a computer system for implementing the present invention.

The computer system of the present embodiment comprises a display 201, a keyboard 202, a mouse 203, a processor 204 and a memory 206. The processor contains therein a program 205 for practising the present invention. An event database 500, a time-series data table 300 and an input data table 400 which are used in the present invention are stored in the memory 206.

The display 201 has various menues and input areas for the transition graph of the time-series data table 300, system information such as prediction hit/miss information and event/news retrieval result, and an input request. The keyboard 202 is used to enter a reply to the input request from the system by numerals or a character sequence. The mouse 203 is a pointing input device which points a screen of the display 201 to enter menu selection information or process start information. The memory 206 is an information storing medium for holding information entered from the input device and various information modified or processed by the processor 204. As described above, the time-series data table 300 which is the bond trade data and the database 300 are also stored there. The processor 204 controls the above units, reads data from the units, write data to the units, and checks data and processes data in accordance with the internally stored program 205.

Figure 3:
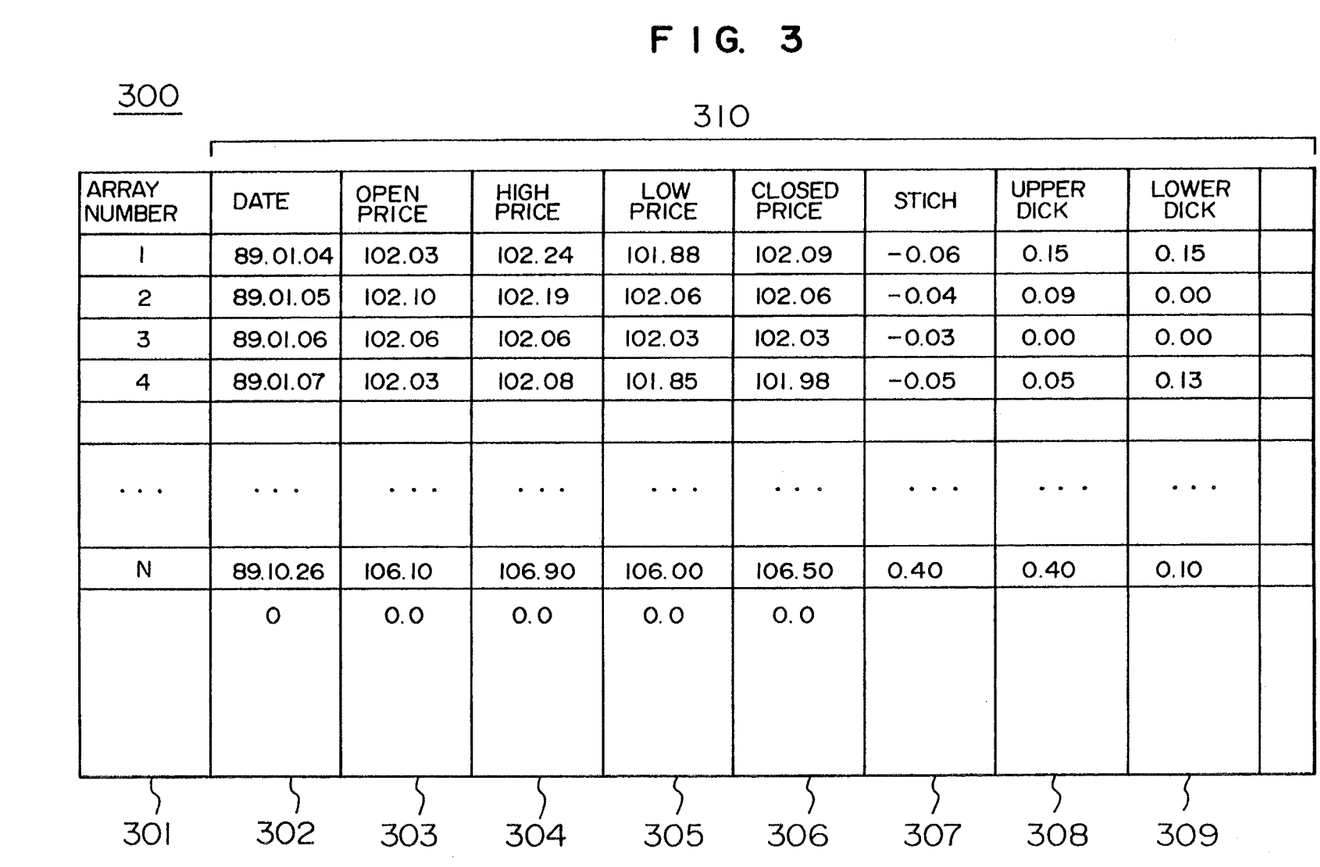
FIG. 3 shows a content of a time-series data table shown in FIG. 1.
Figure 4:
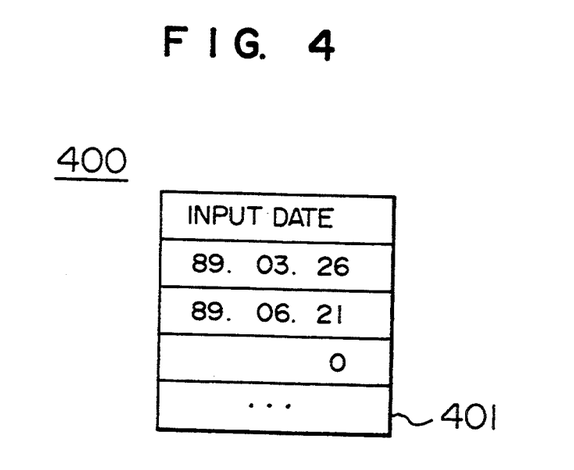
FIG. 4 shows an input data table shown in FIG. 1.

FIG. 3 shows an embodiment of the time-series data table 300 which shows actual prices stored in the memory 206 shown in FIG. 2.

Daily trade data is stored in the time-series data table 300 which shows the past price transition data, as shown in FIG. 3. Data 310 shown in one horizontal line of FIG. 3 corresponds to one-day data, and the actual data includes an array number 301, a date 302 which shows a trade year-month-day, an open price 303 of the trade price on that trade date, a high price 304, a low price 305 and a closed price 306. A stick 307, an upper wick 308 and a lower wick 309 which are derived by modifying the open price 303, the high price 304, the low price 305 and the closed price 306 are also stored in the table 300. The stick 307 is a difference between the closed price 306 and the open price 303 of the some day. It is usually shown by a thick bar (white for rise and black for drop) in the chart (not shown). It indicates an extent of rise/drop of the actual trade price in one day. The upper stick 308 is a difference between the upper price 304 and a larger one of the open price 303 and the closed price in one day. In the chart, it is shown by a thin line extending from a top of the thick bar to represent a high price range in the day. The lower wick is a difference between a smaller one of the open price 303 and the closed price 306 and the low price 305 in the some day. It is represented in the chart by a thin line extending from a bottom of the thick bar.

For example, data in the line of the array number "1" indicates that the trade year-month-day is 89/01/04, the open price is ￥102.03, the high price is ￥102.24, the low price is ￥101.88, the closed price is ￥102.09, the stick is ￥0.06, the upper dick is ￥0.15 and the lower dick is 0.15.

Figure 6:
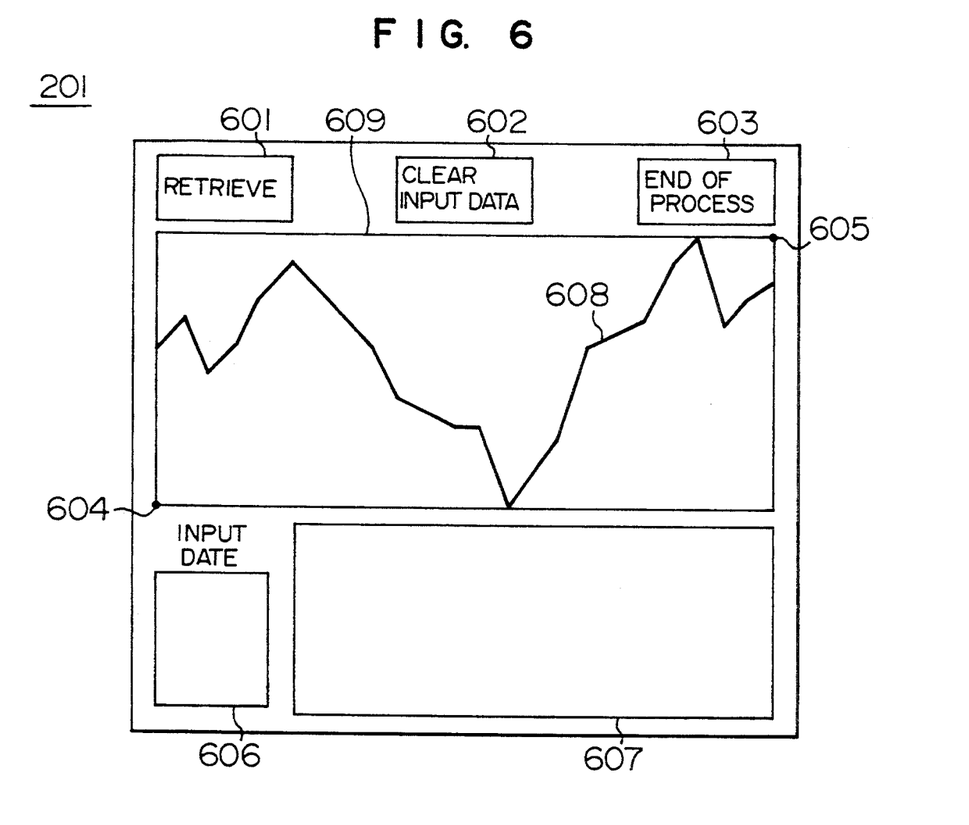
FIG. 6 shows an output chart of a screen in one embodiment of the present invention.
Figure 7:
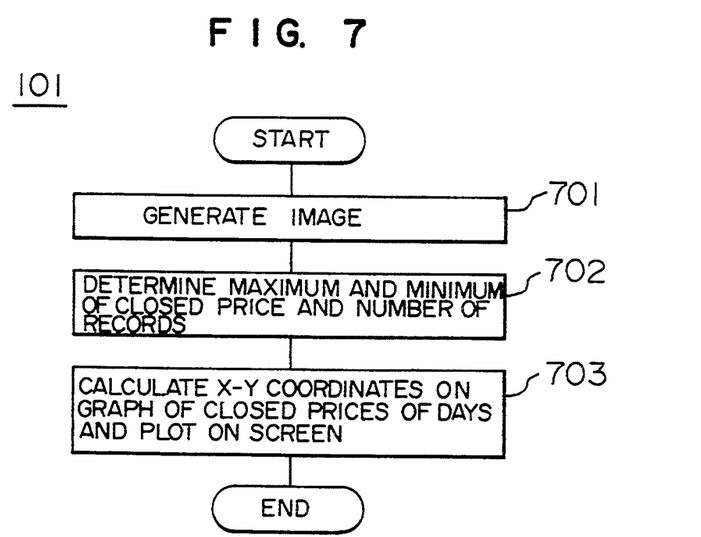
FIG. 7 shows a flow chart of an image generation process in FIG. 1.

FIG. 6 shows an embodiment of a display screen in the present invention, and FIG. 7 shows a flow chart of the display process of the time-series data transition graph.

In FIG. 1, a process (101) for generating an image to display on the display 201 a transition graph of the closed price which is one of data in the time-series data table 300 is first executed. FIG. 7 shows detail of the process 101.

As shown in FIG. 6, command areas 601, 602 and 603 for starting various processes, a transition graph display area 609 having points 604 and 605 as corners of the rectangular area, an input date display area 606 for echo-displaying an input date to be retrieved, and a retrieval result display area 607 for displaying retrieved news or event are displayed on the screen. The following three command areas are provided and a desired one of the areas is pointed by a mouse to proceed the corresponding process. Namely, the retrieval command area 601 to start the retrieval, the input date clear command area 602 for clearing date incorrectly entered, and the end of process command area 603 to proceed to a next process pointed by the mouse when the graph display process is terminated. In the input date display area 606, the date corresponding to the point on the graph 608 pointed by the mouse is instantly displayed (echo display). In the retrieval result display area 607, the information of the stored past political or economical news or events which corresponds to the designated date is displayed. In the transition graph display area 609, the transition graph 608 of the closed price of the trade price stored in the time-series data table 300 shown in FIG. 3 is displayed. While not shown in FIG. 6 to avoid the complexity of the drawing, a scale for reading the closed price is displayed on a vertical axis on the left of the transition graph display area 609, and a scale for reading the date is displayed on a horizontal axis below the transition graph display area 609.

In the transition graph display process 101, as shown in FIG. 7, the image shown in FIG. 6 is first displayed on the display 201 (701), and a maximum value, a minimum value and the number of records are read from the column of the closed price 306 of the time-series data table 300 (702). Then, the individual closed prices 306 are sequentially read, X-Y coordinates on the screen are calculated and the closed price transition graph which connects those coordinates by lines is displayed on the transition graph display area 609 (703)

Figure 8:
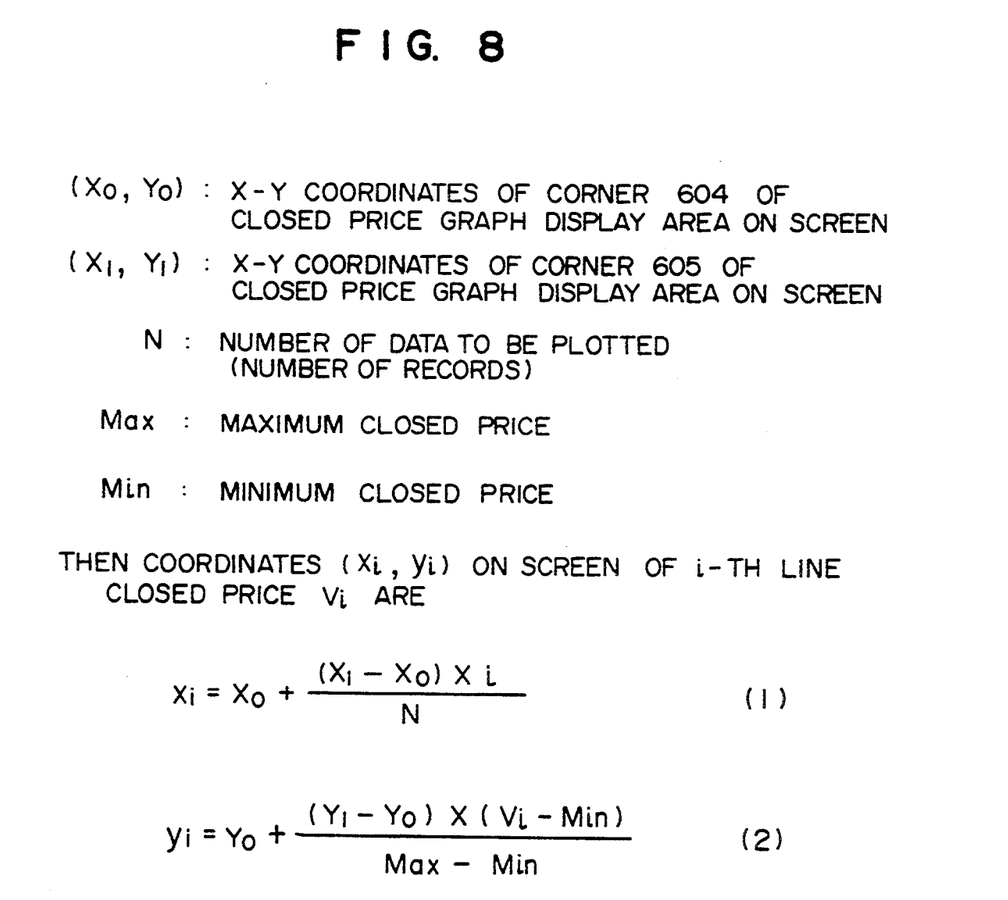
FIG. 8 shows a calculation formula of display coordinates of a time-series data transition graph in the present invention.
Figure 9:
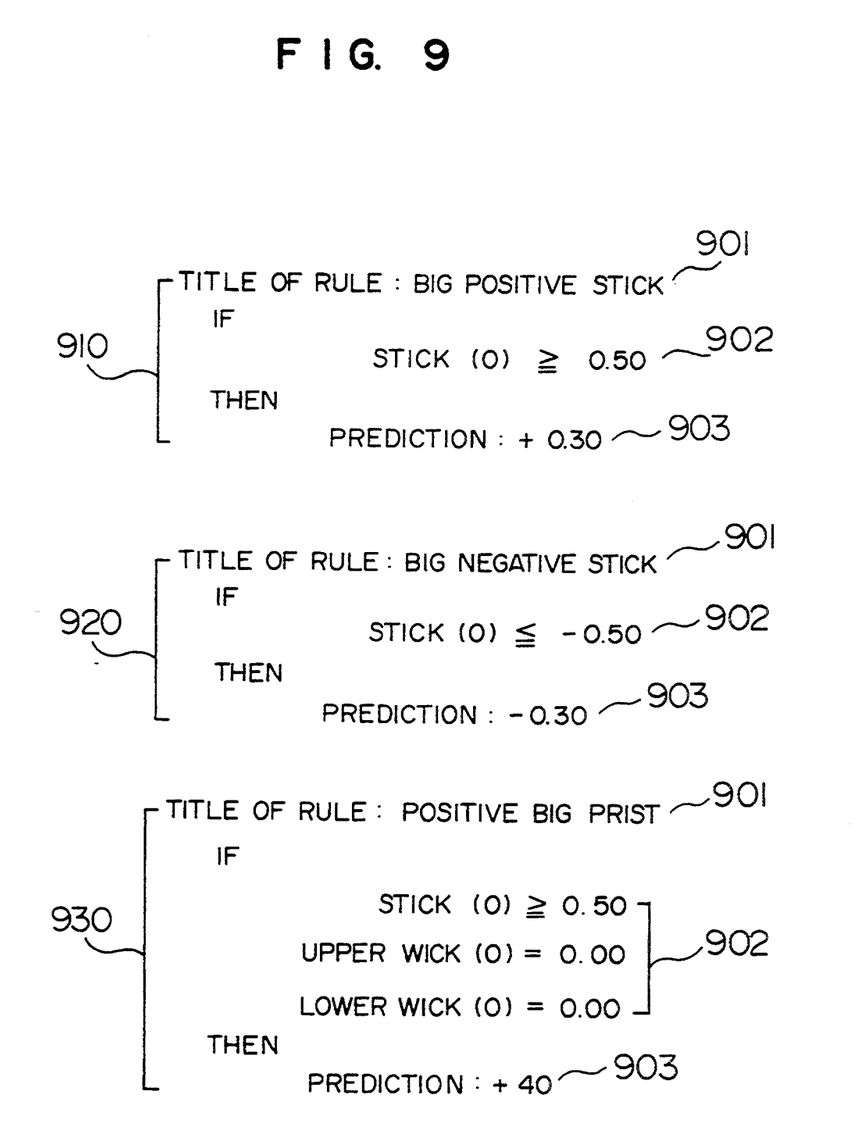
FIG. 9 shows an example of description of an IF-THEN type rule used in the prediction process of the present invention.
Figure 10:
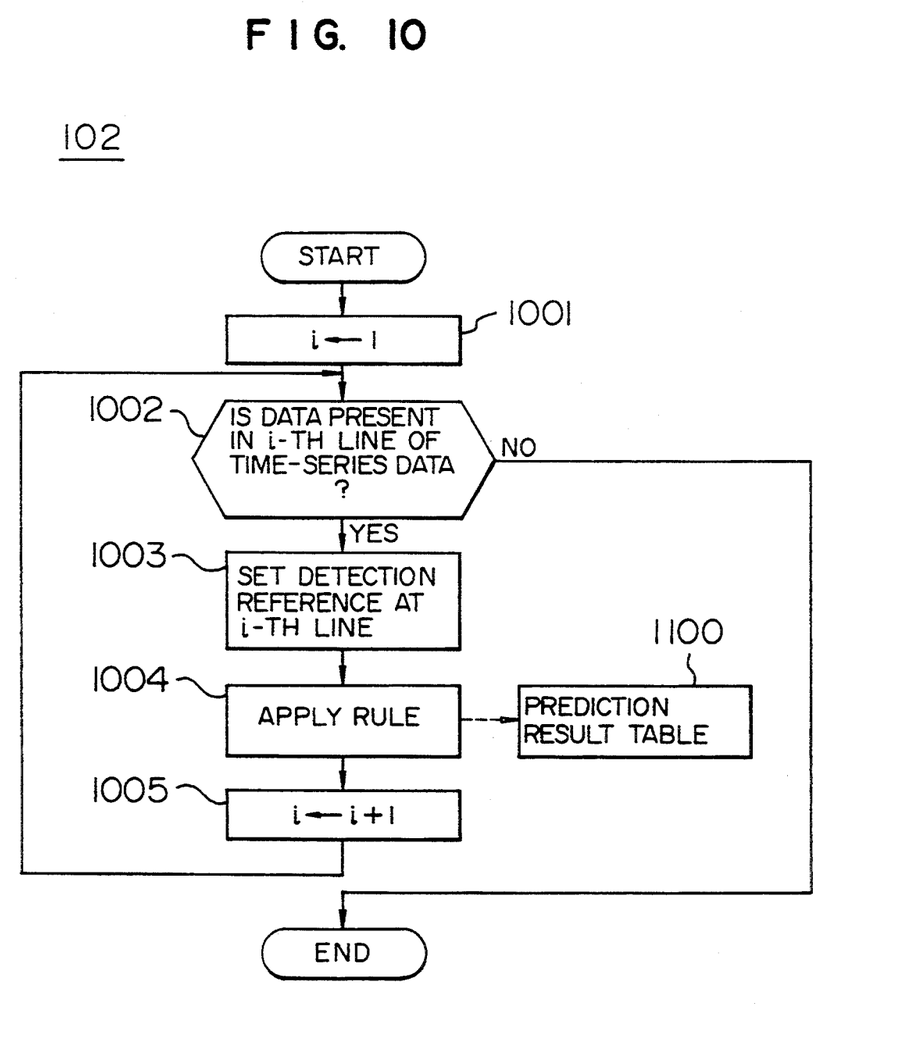
FIG. 10 shows a flow chart of the prediction process of the time-series data in FIG. 1.

FIG. 8 shows a calculation formula for the display coordinates of the time-series data transition graph, FIG. 9 shows description of an IF-THEN type rule used in the time-series data prediction process 102 shown in FIG. 1, and FIG. 10 shows a flow chart of detail of the prediction process 102.

In order to display the transition graph 608 shown in FIG. 6, the X-Y coordinates on the image are calculated by the calculation formula shown in FIG. 8. The coordinates Xi, Yi on the image of the closed price Vi of the i-th array are calculated by using the coordinates Xo, Yo of the corner 604 of the transition graph display area 609, the coordinates Xi, Yi of the corner 605, the number of plotted data (the number of records) N, the maximum closed price Max, and the minimum closed price Min. The formula (1) is for calculating the X coordinate and the formula (2) is for calculating the Y coordinate. In this manner, the transition graph 608 shown in FIG. 6 is displayed.

Detail of the time-series data prediction process of FIG. 1 is now explained.

As shown in FIG. 10, in the time-series data prediction process, deduction is sequentially made to the past data of a predetermined period to predict the data. In the prediction process of the present embodiment, a next day closed price 306 is predicted. In this prediction process, the IF-THEN rule shown in FIG. 9 is used.

The rule shown in FIG. 9 comprises a title of rule 901, a condition part 902 shown by IF, and execution part 903 shown by THEN. For example, in a big positive stick rule 910 shown in FIG. 9, if a positive line of the stick of a day is equal to or larger than ￥0.50 (902), then ￥0.30 is added to the prediction value for the next day closed price (903). In a big negative rule 920, if a negative line of the stick of a day is equal to or smaller than ￥0.50 (902), then ￥0.30 is subtracted from the prediction value for the next day closed price (903). In a positive big prist rule 930, if there is no upper wick or lower wick and a positive line of the stick is equal to or larger than ￥0.50 (902), then ￥0.40 is added to the prediction value for the next day closed price (903).

The rules shown in FIG. 9 are stored in the memory 206. The (0) in the stick (0) is an identifier for indicating a relative position to a reference array number of the actual trade table 300 which is accessed in the deduction. The stick (0) indicates the today's data. In FIG. 9, since the value which indicates the reference for the deduction on the time-serial data is (0) in any of the rules 910, 920 and 930, the data of the same line as the deduction reference is referred.

Figure 11:
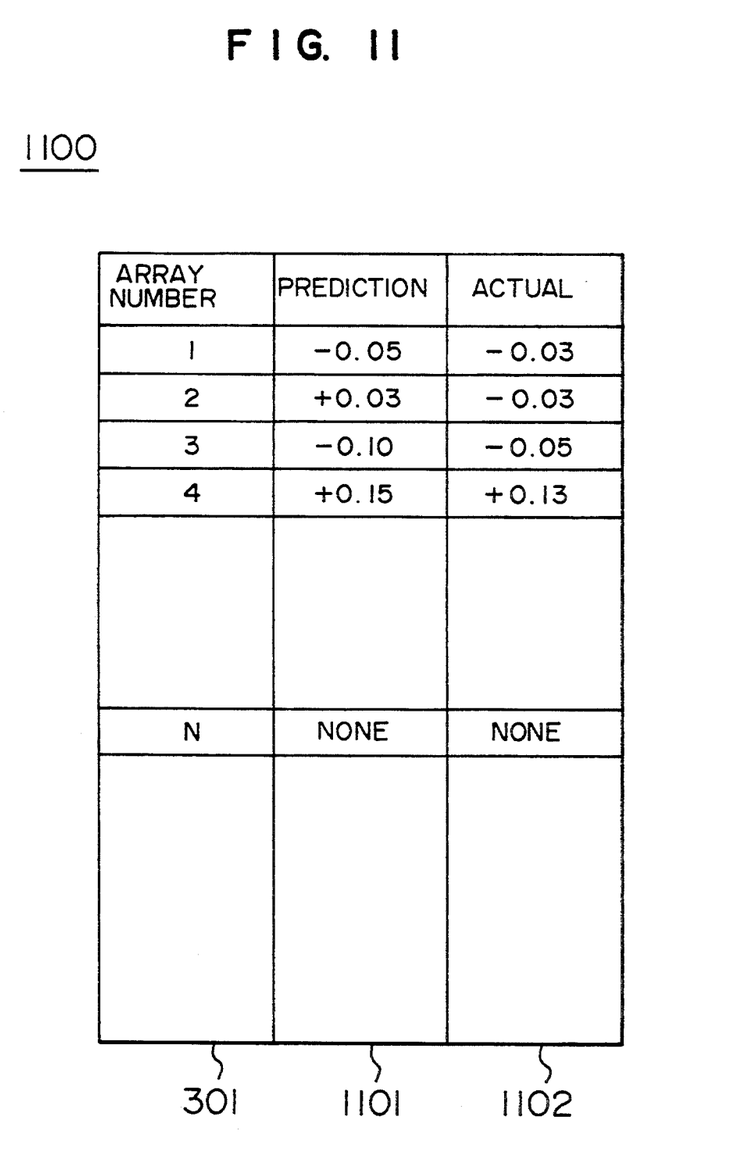
FIG. 11 shows a content of a prediction result table used in the present invention.

FIG. 11 shows a format of the prediction result table 1100 of the present invention. The prediction result table 1100 shown in FIG. 11 is stored in the memory 206.

As shown in FIG. 10, in the prediction process 102, the prediction values are calculated for all values in the table 300 shown in FIG. 3. Whether the calculation has been completed for all values or not is determined by detecting "0" which is stored next to the last value.

First, "1" is set to an internal variable i (1001). Next, whether data is actually present in the line of the array number 301 designated by the internal variable i or not is determined (1002). The internal variable i indicates the reference point. In the determination step 1002, whether "0" is stored in the i-th line or not is determined. If the data stored in the i-th line is "0", it means the end of data and the process is terminated. On the other hand, if there is data to be predicted (1002), the deduction reference is set to the i-th line (1003) and the prediction result is calculated by applying the IF-THEN rule (1004). Namely, if it is four days before as counted from the next day, "−4" is set as the deduction reference. When the rule is to be applied, the rules are read one by one and whether the condition part 902 of the rule is met or not is evaluated. If the condition part 902 is wet, the execution part 903 is executed.

When the prediction result is obtained, the prediction result is stored in the column of the prediction value 1101 on the same line as the i-th array number 301 of the prediction result table 1100 shown in FIG. 11. The next column to the prediction value 1101 is an actual value column 1102 in which a change of the actual closed price {(next day's closed price)−(today's closed price)} is stored. After the prediction value has been stored in the prediction result table 1100, the program variable i is incremented by one (1005), and the process returns to the step 1002 to repeat the above steps.

In this manner, the line of the prediction values 1101 is stored in the prediction result table 1100 and the system prediction values for the predetermined past period is held.

Figure 12:
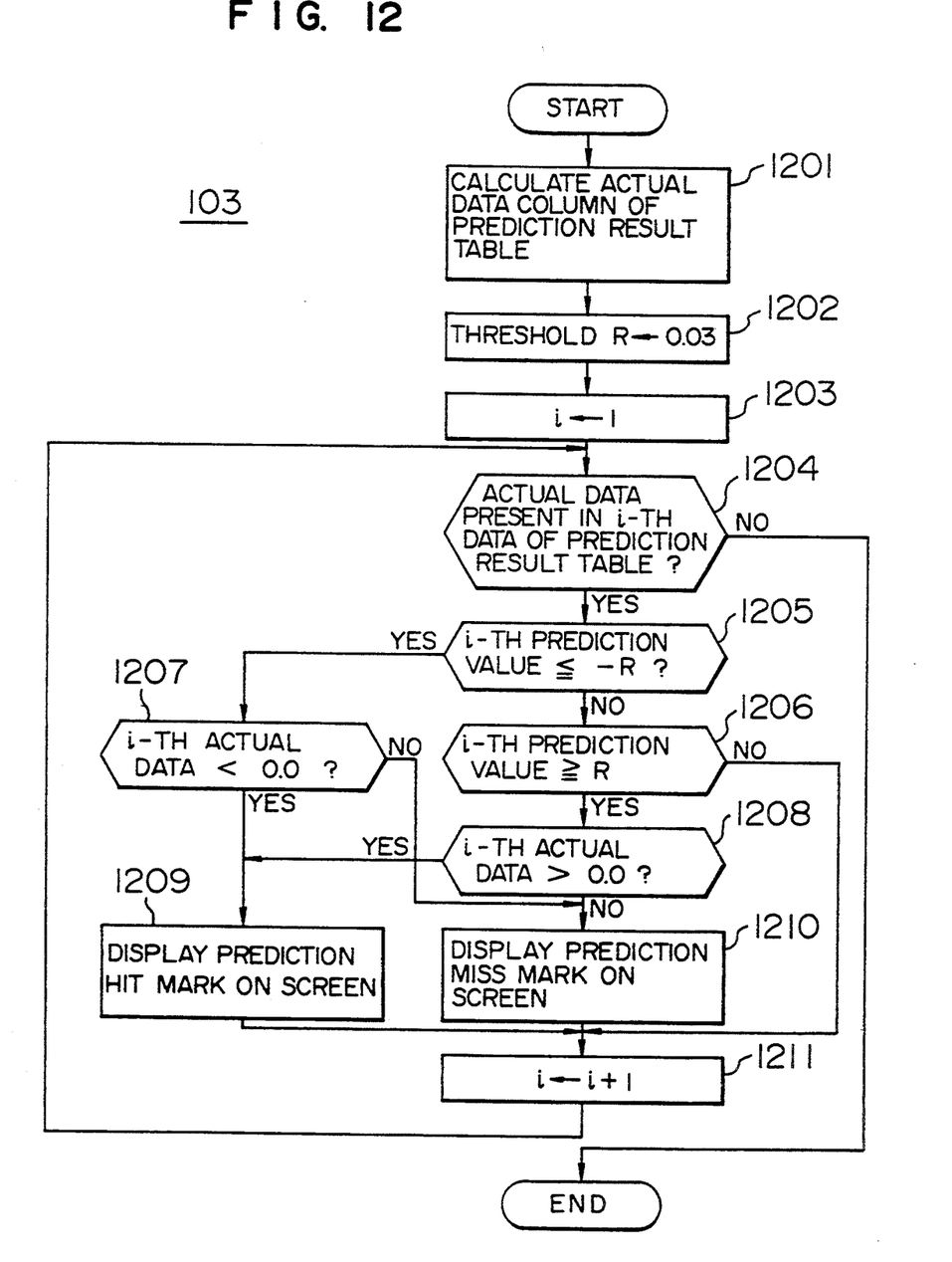
FIG. 12 shows a flow chart of a display process to a graph of prediction hit/miss information in FIG. 1.

FIG. 12 shows a flow chart of detail of the process 103 for displaying the mark representing the hit/miss of the prediction result.

In FIG. 1, when the prediction process 102 for the time-series data is completed, the hit/miss of the predicted result is checked and the result thereof is displayed on the display 201 in a process 103.

As shown in FIG. 12, in the process 103, actual data column 1102 of a prediction result table 1100 is calculated to fill flank columns (1201). As described above, the (i+1)th data of the closing price 306 of the time-series data table 300 less the i-th data is stored in the actual data column 1102. A value "0.03" is set to the internal variable R (1202). The value R is a predetermined threshold for "struggling". When one of rise (price-up), fall (price-down) and struggling is to be determined for the system prediction value 1101, it is determined as struggling if the prediction value 1101 is within the threshold (∓0.03). Accordingly, if the prediction value is within −0.03 ∼ +0.03, it is determined as struggling, if it is less than ∓ −0.03, it is determined as fall, and if it is more than ∓ +0.03, it is determined as rise.

Then, "1" is set to the internal variable i (1203) to determine if there is data in the i-th row actual data column of the prediction result table 1100 (1204). If no data is present, it is interpreted as the end of data and the process is terminated. If there is actual data, the i-th predicted value 1101 is taken out, and whether it is less than −R or not is determined (1205). If the i-th predicted value 1101 is less than −R, it is interpreted as the fall, and whether the i-th actual data 1102 is negative or not is determined (1207). If the actual data is negative, it is interpreted that the prediction and the actual data match and a prediction hit mark is displayed at a corresponding area in the transition graph display area 609 (1209). If the actual data is not negative, it means that the prediction mismatches to the actual data and a prediction miss mark is displayed on the screen (1210).

On the other hand, if the predicted value is not interpreted as the fall in the decision step 1205, whether the i-th predicted value 1101 is larger than R or not is determined (1206). If it is larger than R, it is interpreted as the rise and whether the i-th actual data 1102 is positive or not is determined (1208). If the actual data 1102 is positive, it is interpreted that the predicted value matches to the actual data and a prediction hit mark is displayed (1209). If it is not positive, the prediction miss mark is displayed (1210). An X-coordinate of the mark position in the mark display process at the steps 1209 and 1210 is calculated by using a formula (1) shown in FIG. 8. A Y-coordinate of the mark position is set to 10 pixels below the top of the transition graph area.

If the predicted value is not the rise in the decision step 1206, it is interpreted as the struggling, and the process proceeds to a step 1211. In this manner, the hit/miss of the prediction result for the i-th data is displayed and then the internal variable i is incremented by one (1211), and the process returns again to the step 1204 to repeat the same process for the next row. As a result, the system prediction result hit/miss is displayed on the transition graph.

Figure 13:
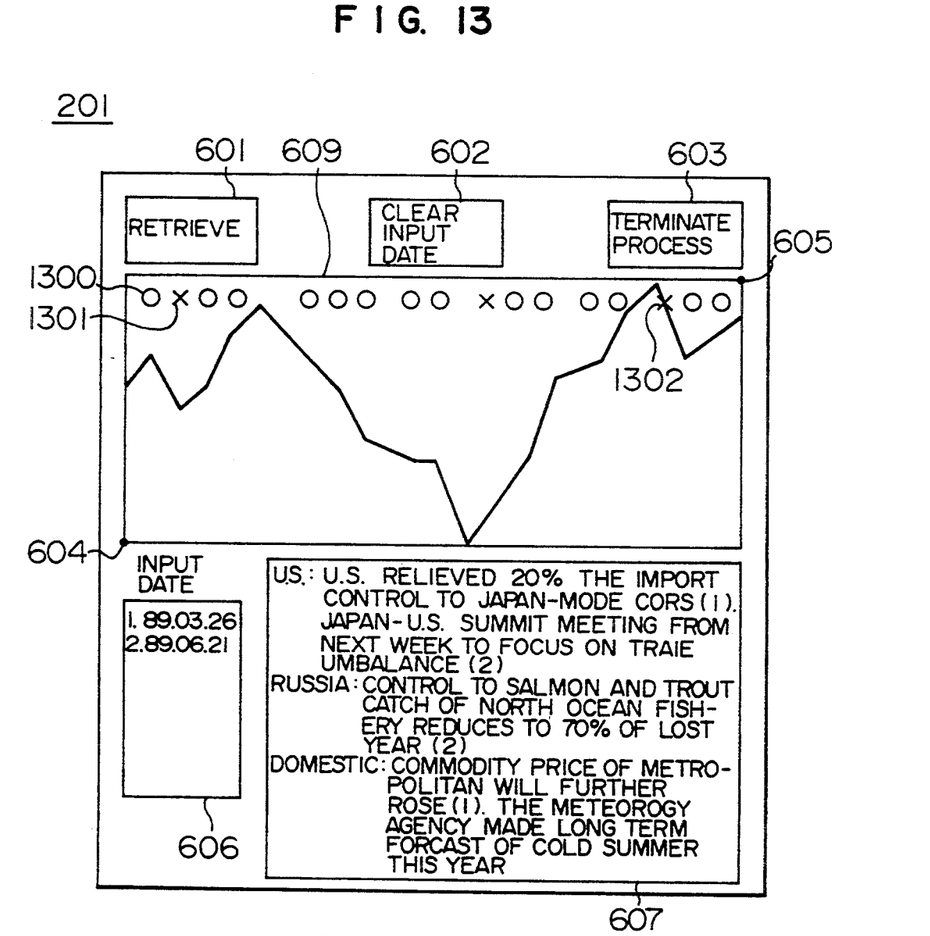
FIG. 13 shows an example of output of a screen after the display of the retrieval result.

An example of display of the hit/miss is shown in FIG. 13. A mark "O" (1300) shown in FIG. 13 is the hit mark, and a mark "x" (1301) is the miss mark. Since the system prediction result hit/miss is displayed on the time-series data transition graph by the display process 103 of the prediction hit/miss information, the user can easily determine which hit and which missed.

The screen position information process 104 of FIG. 1 is now explained.

The user enters the screen position information (104) by directly pointing the screen of the display 201 by the mouse 203. Namely, the user watches the display of the prediction result hit/miss and enters the reference date for the prediction miss in order to check the reason for the prediction miss. Then, the news or events of that date are displayed on the screen. The information which the user enters by using the mouse 203 is the X-Y coordinates on the screen.

Then, whether the input coordinate position is within the end of process command area 603 of FIG. 13 or not is determined (105), and if it is, the entire process is terminated. If the coordinate position is not within the end of process command 603, whether the input coordinate position is within the transition graph display area 609 or not is determined (106). If it is within the transition graph display area 609, the date of the time-series data corresponding to the input coordinate position is determined, and the date information is stored into the input date table 400. The date information with a numeral indicating a sequence of retrieval is displayed in the input date echo-display area 606 on the display 201 (107). Then, the process returns to the step 104.

Figure 14:
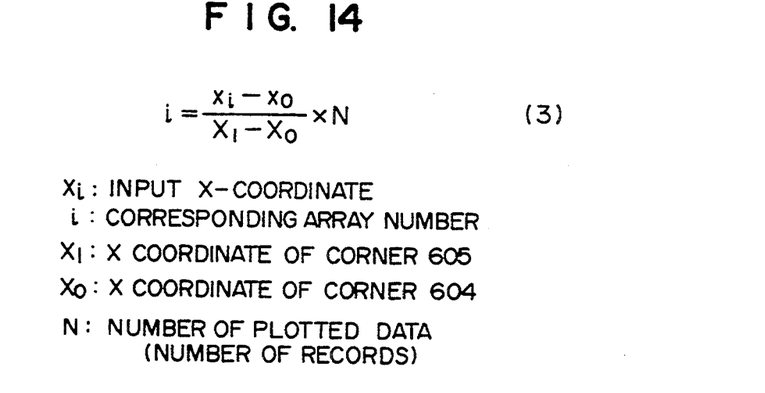
FIG. 14 shows a calculation formula for taking out a corresponding date from input coordinates.

FIG. 14 shows a calculation formula for taking out the corresponding date from the input coordinate, that is, the X-coordinate. Definitions of the variables shown in FIG. 14 are same as those of FIG. 8. In order to determine the date corresponding to the input coordinate, the corresponding array number (i) 301 of the time-series data table 300 is determined by using a formula (3) of FIG. 14 and the date 302 stored in that row is taken out.

On the other hand, if the input coordinate position is not within the transition graph display area 609 in the step 106, whether the input coordinate position is within the event retrieval command area 601 or not is further determined (108). If it is in the event retrieval command area 601, the dates of the items to be retrieved stored in the input date table 400 are taken out one by one, and the event database 500 is searched by using the date as a key, and the retrieved result is displayed on the retrieval result display area 607 of the display 201 (109).

Figure 5:
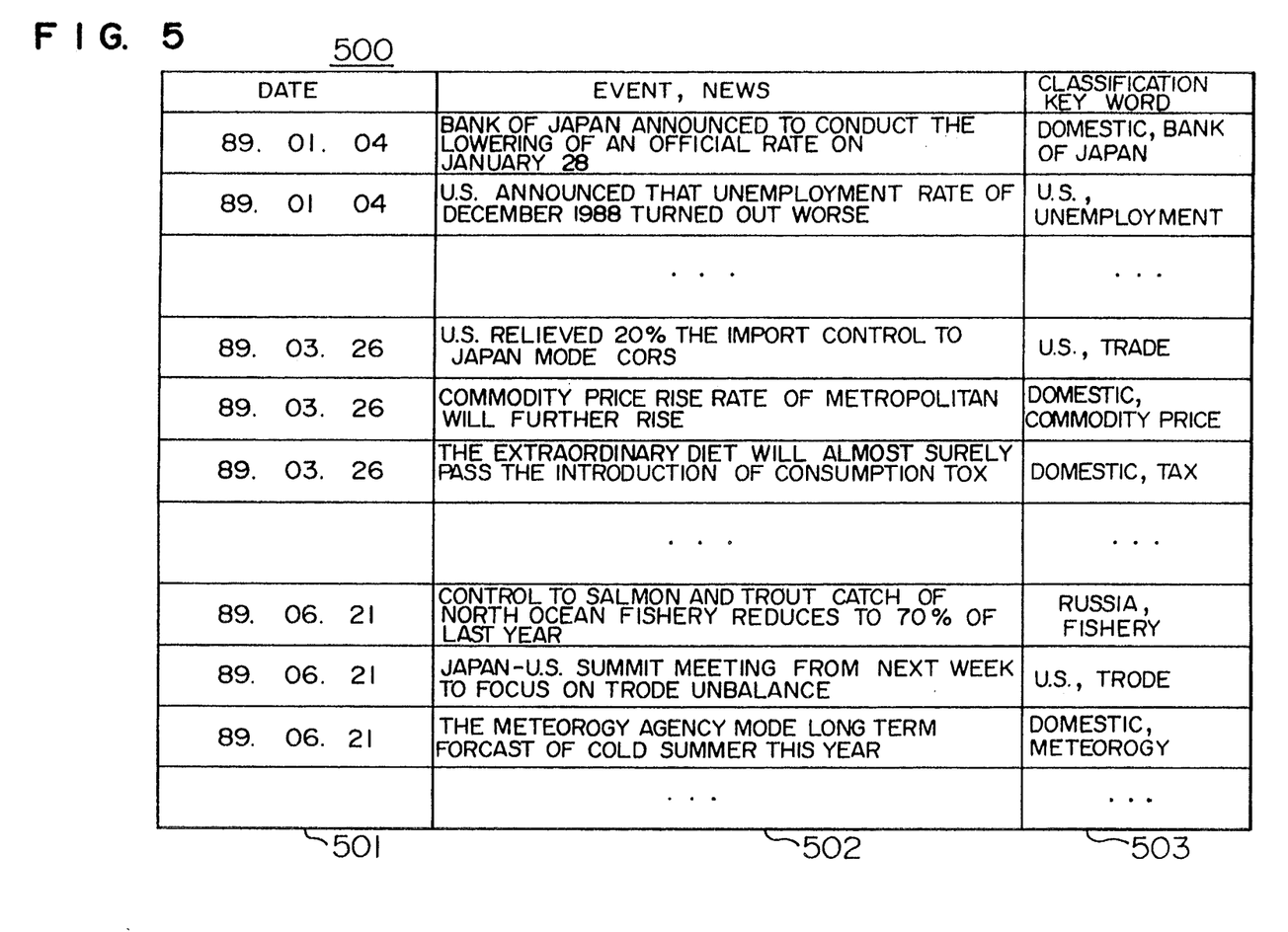
FIG. 5 shows a content of an event database shown in FIG. 1.

In the event database search/display step 109, if the date stored in the input date table 400 matches to the date 501 of the event database 500 shown in FIG. 5, the date and the corresponding content of the event database are temporarily stored into a table which has the same format as that of the event database 500. After the search has been completed, they are sorted by a classification keyword and the sorted content is displayed in the retrieval result display area 607 as shown in FIG. 13.

As shown in FIG. 13, the content is searched by using the events on 89.03.26 as an order (1) and the events on 89.06.21 as an order (2), and in the sort process, the events are classified by country such as USA, Russia and domestic, and the contents are taken out by the orders (1) and (2) for each country and are displayed in the retrieval result display area 607. For example, in FIG. 13, two information of the order (1) relating to the input date 89.03.26 and one information of the order (2) relating to the input date 89.06.21 are displayed as the domestic events.

The event database 500 shown in FIG. 5 is now explained.

The event database 500 comprises contents 502 of events and news concerning worldwide status and domestic economy which are considered to be pertinent to the trade prices of commodities, dates 501 of occurrence of thereof, and classification key words 503 applied to the contents. The database 500 is stored in the memory 206. Since the information of the date 501 and the content 502 is sent from various information providers as on-line digital data, they can easily be stored into the memory 206. Accordingly, the user need to add the classification key words 503 only.

In the screen output shown in FIG. 13, the two dates for the system prediction miss points 1301 and 1302 are selected and those dates 89.03.26 and 89.06.21 are displayed in the input date echo-display area 606. In the retrieval result display area 607, the result sorted by the country which is a primary key word of the database classification key words 503 shown in FIG. 5 is displayed.

In FIG. 1, when the search/display process 109 for the event database 500 is completed, the input date table 400 is cleared and the process returns to the step 104 to repeat the subsequent steps.

In accordance with the present invention, the user may select a desired point of the time-series data while he/she watches the hit/miss of the system prediction. Further, since the news and event information which occurred on the date corresponding to the selected point is displayed to the user, the user may make proper prediction from the next time by taking similar information into consideration. Namely, in FIG. 11, the predicted value 1101 stored in the prediction result table 1000 shown in FIG. 11 mismatches to the actual data 1102, and the user watches the news and events of the date of the prediction miss so that he/she may take the mismatch value into consideration when similar news or event happens in order to make more appropriate prediction.

The input date clear command 602 shown in FIG. 13 is provided to allow the user to correct the date if he/she misenters the retrieval date. If the user misenters the date, he/she may point the input date clear command area 602 by the mouse to clear the content of the input date table 400 and the input date echo-display area 606.

In accordance with the present embodiment, since the system prediction hit/miss points are displayed at the corresponding positions on the time-series data transition graph, the user can quickly recognize the prediction hit/miss. When the user enters the retrieval date to get news and event information which occurred on that date, the user can check the cause of the prediction hit/miss. Namely, by entering the date of the system prediction date, the user may try to determine the reason why the price did not change as predicted, from the news and event information. Thus, the user may quickly refer the information which is difficult to handle as numeric data, although it is after the output of the prediction system result. If the difference between the predicted value and the actual value is substantially constant when similar news or events occur several times, the user determines that there is a regularity in the retrieved result and takes the regulation into consideration at the next prediction to make more appropriate prediction.

The retrieval result to be displayed on the screen is sorted by the predetermined classification key words and related contents are displayed in union. Thus, they are displayed in a format easy to recognize by the user.

In the above embodiment, the IF-THEN type rule is used as the system prediction technique although it is not restrictive. For example, any method for predicting the time-series data such as neuro-method or recursive analysis method may be used.

In accordance with the present invention, the system prediction hit/miss points are displayed on the transition graph of the time-series data to permit the user to recognize the hit/miss and request to the user to enter the retrieval date to retrieve the news and event information which occurred on that date. By entering the prediction miss date, the user may determine the cause of the prediction miss from the news or event information. Thus, the user may refer the character sequence information which is difficult to handle as the numeric data, in association with the prediction result.

What is claimed is:

1. A method for retrieving time-series information by predicting future time-series information based on determined time-series information by using a computer having a memory; comprising the steps of:

preparing detail of the determined time-series information in a table;

storing past time-series news and event information in a database;

displaying a graph representing transition of the determined time-series information on a screen;

calculating prediction result for each point based on the detail of the determined time-series information;

determining whether the calculated prediction result hits to the determined time-series information or not;

applying a hit/miss mark on the graph; and retrieving past time-series news and event information corresponding to a time point on the graph entered by a user and displaying the retrieved news and event information on the screen.

2. A method for retrieving time-series information according to claim 1 wherein said database contains the time-series past news and event information as well as classification information, and when the news and event information are retrieved and to be displayed on the screen the news and event information are classified by the class.

3. A method for retrieving time-series information according to claim 1 wherein the determined time-series information is data relating to a trade price in dealing, and when prediction result for a time point of the past data is to be calculated, a trade price is predicted by using an IF-THEN type rule.

4. A method for retrieving time-series information according to claim 2 wherein the determined time-series information is data relating to a trade price in dealing, and when prediction result for a time point of the past data is to be calculated, a trade price is predicted by using an IF-THEN type rule.

5. A method for retrieving time-series information by predicting future time-series information based on determined time-series information by using a computer having a memory, comprising the steps of:

storing time-series past news and event information in a database in association with the determined time-series information;

displaying a graph representing a transition of the determined time-series information on a screen;

determining a time point on the time-series information corresponding to a point on the displayed time-series information graph pointed by a user; and querying to the database by using the determined time point.

6. A system for retrieving time-series information comprising:

a keyboard for entering a retrieval condition by a user;

a processor for carrying out retrieval and information display processes;

a display for displaying a processed result;

a memory for storing a database storing time-series past news and event information; and a screen of said display including a graph display area for displaying a graph indicating a transition of determined time-series information, a hit/miss display area for displaying a mark indicating the hit/miss of prediction result at each time point on the graph, an area for designating a retrieval execution command, a command for clearing date misentered from the keyboard, and an end of process command, an input date display area for displaying an input date for retrieval, and a retrieval result display area for displaying news and event information retrieved from the database.

7. A method for retrieving time-series information by predicting future time-series information based on determined time-series information by using a computer having a memory comprising the steps of:

displaying a transition graph of time-series data;

determining prediction data based on the determined time-series information;

displaying the validity of prediction to actual data on the graph; and retrieving news and event information occurred at a time point entered by a user from an event database and displaying the retrieved news and event in a designated area.

* * * * *